(12) United States Patent
Pasino

(10) Patent No.: US 8,591,112 B2
(45) Date of Patent: Nov. 26, 2013

(54) GUIDING AND SEALING UNIT FOR A ROD OF A MONO-TUBE SHOCK ABSORBER AND ANNULAR SEALING ASSEMBLY THEREFORE

(75) Inventor: Robert Pasino, Castellero (IT)

(73) Assignee: Aktiebolaget SKF, Göteborg (SE)

( * ) Notice: Subject to any disclaimer, the term of this patent is extended or adjusted under 35 U.S.C. 154(b) by 129 days.

(21) Appl. No.: 13/197,882

(22) Filed: Aug. 4, 2011

(65) Prior Publication Data

US 2012/0063707 A1  Mar. 15, 2012

(30) Foreign Application Priority Data

Aug. 9, 2010  (IT) .............................. TO2010A0689

(51) Int. Cl.
- F16C 33/74 (2006.01)
- F16C 17/00 (2006.01)
- F16J 15/16 (2006.01)

(52) U.S. Cl.
USPC .............. 384/16; 384/129; 384/130; 277/573

(58) Field of Classification Search
USPC ........... 384/16, 159, 477, 484, 488, 129–130; 277/345, 551, 558, 559, 562, 565, 277/572–573
See application file for complete search history.

(56) References Cited

U.S. PATENT DOCUMENTS

| | | | |
|---|---|---|---|
| 3,394,939 A | | 7/1968 | Mastro |
| 4,053,166 A | * | 10/1977 | Domkowski .................. 277/558 |
| 4,527,806 A | * | 7/1985 | Ungchusri et al. ............ 277/530 |
| 5,183,271 A | * | 2/1993 | Wada et al. .................... 277/351 |
| 5,346,230 A | * | 9/1994 | Schumacher et al. ........ 277/551 |
| 5,664,651 A | * | 9/1997 | Miura et al. ............. 188/322.17 |
| 5,855,375 A | | 1/1999 | Wilcox |
| 6,173,961 B1 | * | 1/2001 | Martin .......................... 277/353 |
| 6,322,082 B1 | * | 11/2001 | Paykin .......................... 277/549 |
| 6,712,362 B2 | * | 3/2004 | Krappmann et al. ......... 277/437 |
| 2007/0052180 A1 | * | 3/2007 | Watanabe et al. ............. 277/551 |
| 2008/0018059 A1 | * | 1/2008 | Otuka ........................... 277/650 |
| 2008/0309016 A1 | * | 12/2008 | Ozawa et al. ................. 277/345 |

FOREIGN PATENT DOCUMENTS

| | | | | |
|---|---|---|---|---|
| DE | 8201327 U1 | 5/1982 | | |
| EP | 1074760 A2 | 2/2001 | | |
| EP | 1666778 A | 6/2006 | | |
| EP | 1939485 A | 7/2008 | | |
| EP | 06425875 A1 | 7/2008 | | |
| JP | 09105467 A | * 4/1997 | .............. | F16J 15/32 |
| JP | 2000130585 A | * 5/2000 | .............. | F16J 15/06 |
| JP | 2000346203 A | * 12/2000 | .............. | F16J 15/32 |
| JP | 2003106462 A | 4/2003 | | |
| JP | 2008309263 A | * 12/2008 | .............. | F16J 15/32 |

* cited by examiner

*Primary Examiner* — Marcus Charles
(74) *Attorney, Agent, or Firm* — Bryan Peckjian; SKF USA Patent Group

(57) ABSTRACT

A guiding and sealing unit for a rod of a shock absorber, including a bushing, and a sealing assembly pressed into a cup-shaped seat on one end of the bushing facing the inside of the shock absorber body. The sealing assembly includes a sealing ring and an annular sealing lip that contacts the rod, a metallic reinforcing structure having a flange-shaped portion that abuts the end of the bushing and a sleeve-shaped portion. A reinforcing ring snappingly mounted on the sealing ring on a side opposite to the lip, engaged on the rod, and made of a low friction coefficient material that is more rigid than the material used to form the sealing ring and which axially extends in the seat flanking at least in part, the sleeve-like portion of the reinforcing structure.

9 Claims, 2 Drawing Sheets

GUIDING AND SEALING UNIT FOR A ROD OF A MONO-TUBE SHOCK ABSORBER AND ANNULAR SEALING ASSEMBLY THEREFORE

CROSS REFERENCE

This application claims priority to Italian Patent Application No. TO2010A000689 filed on Aug. 9, 2010, the contents of which are fully incorporated herein by reference.

BACKGROUND OF THE INVENTION

The present invention relates to a guiding and sealing unit for a mono-tube shock absorber rod and to an annular sealing assembly incorporated within.

Hydraulic shock absorbers of the mono-tube type, extensively used in the automotive and other industries, are intended to work under relatively high hydraulic pressures, in average about 20 bars, with peaks which may reach 100 bars. In view of such high working pressures, the sealing of the pressurized oil contained in the shock absorber, acts against the reciprocating motion of the piston body.

The sealing assembly of the prior art comprises many elements to be assembled separately and this is relatively cumbersome and complex to mount, and has a performance which tends to decay as the temperature decreases. In particular, when the rubber ring of DE8201327U, which constitutes the main sealing element, is formed from a particular synthetic fluorinated elastomeric material, known as FKM, the minimum working temperature of the sealing assembly is no lower than minus 15° C. degrees centigrade, when instead the current applications would require a minimum working temperature of minus 40° C. degrees centigrade.

Sealing assemblies for shock absorber rods and guiding units thereof are particularly suited to withstand fatigue stress and thus to remain efficient for a relatively long period of time are known from European patent EP1074760B1 and European patent application EP-A-06425875. However, the sealing assembly described in European patent EP1074760B1 is not adapted to be used on mono-tube shock absorbers and, like the sealing assembly according to European patent EP-A-06425875, has a smaller axial bulk size than that of DE8201327U, but still relatively high in the perspective of aiming to reduce the overall dimensions and weight of the shock absorber maintaining the same working stroke. Furthermore, the performance over time of the sliding lips of the elastomeric part of the sealing assembly can still be improved as will be disclosed.

It is the object of the present invention to provide a guiding and sealing unit for a rod of a mono-tube shock absorber and a sealing assembly therein which are free from the drawbacks of the prior art, and in particular which are adapted for application on shock absorbers of the mono-tube type, which easily withstand very low working temperatures and, more generally, working temperatures within a wide temperature range, e.g. comprised between −40° C. and +200° C., which have small dimensions, in particular in axial sense, i.e. in the direction of reciprocating motion of the shock absorber rod, which are simple and cost-effective to make and to mount, and which integrate multiple functions.

SUMMARY OF THE INVENTION

According to the invention a guiding and sealing unit is thus provided, in particular for a mono-tube shock absorber rod, as defined in claim 1. A sealing assembly for such a guiding and sealing unit is further provided.

The particular geometry of the sealing assembly and of the respective guiding unit according to the invention allows to limit in application the maximum deformation in radial direction of the sealing lip thus also obtaining a synergic effect which allows, on one hand, to avoid the known performance decay in response to a temperature decrease and, on the other hand, to increase the duration of the improved sealing conditions over time. This is accomplished in the presence of extremely high pressure peaks, while reducing the overall axial dimensions of the guiding and sealing unit at the same time.

Furthermore, a considerable construction and assembly simplification is obtained, which provides considerable economic advantages, wherein a more compact rod guide is provided that allows a reduction in the total length and weight of the shock absorber while maintaining the same working stroke.

Finally, the guiding and sealing unit according to the present invention can be pre-assembled, which allows coupling to the shock absorber body with a single operation. This obtains a further considerable reduction of the axial dimension of the unit.

BRIEF DESCRIPTION OF THE SEVERAL VIEWS OF THE DRAWINGS

The invention will now be described with reference to the accompanying drawings which illustrate a non-limitative embodiment thereof, in which.

DETAILED DESCRIPTION OF THE INVENTION

Figure 1:
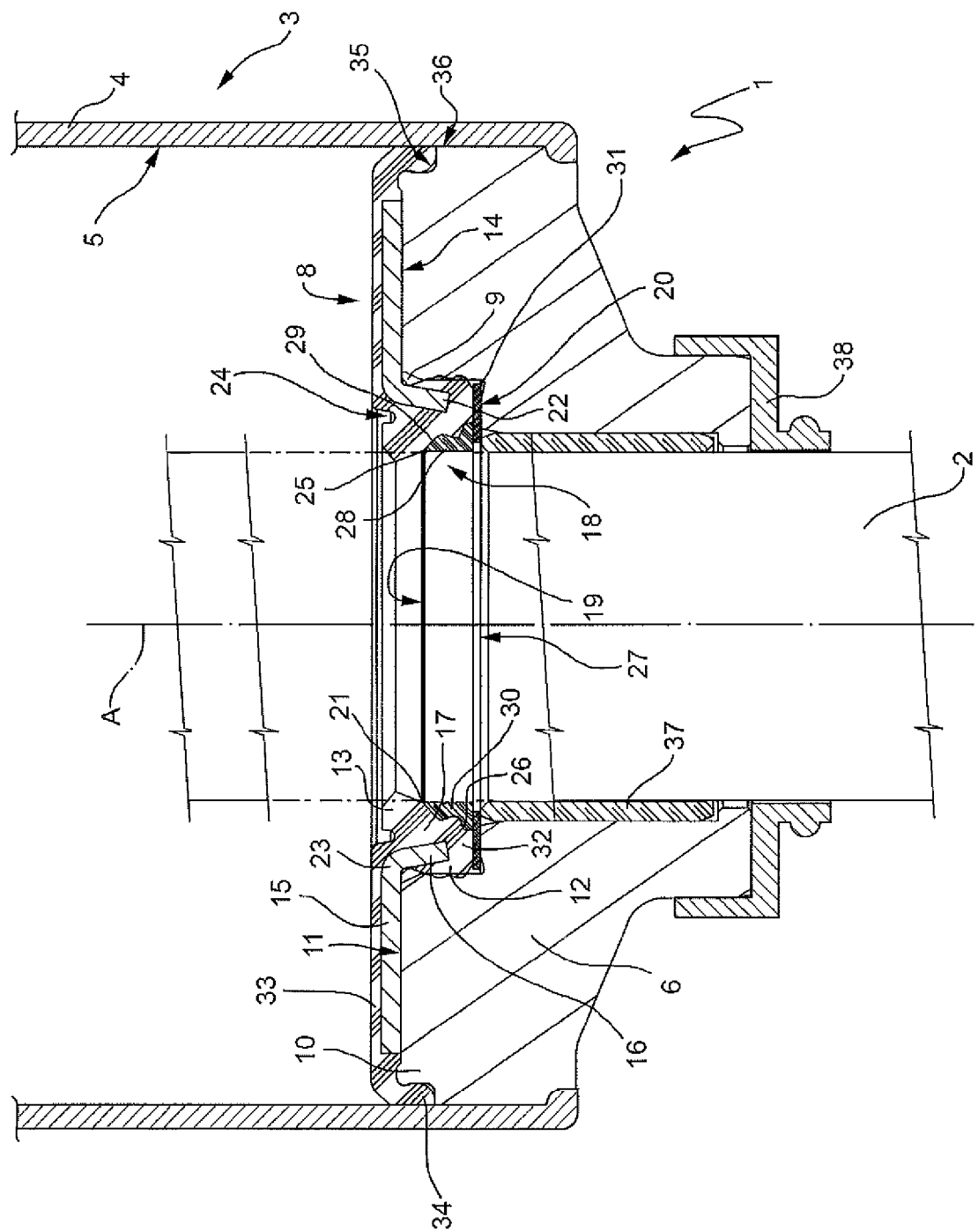
FIG. 1 illustrates, in cross section a first preferred embodiment of a portion of a shock absorber provided with a guiding and sealing unit according to the present invention.

With reference to figures from 1 to 3, numeral 1 indicates as a whole, a guiding and sealing unit 1 for a rod 2 of a mono-tube shock absorber 3, illustrated only in part for the sake of simplicity and known for the rest, having a shock absorber body 4, in use filled with oil and crossed by a piston (not shown), delimited by an inner side wall 5. Unit 1 is fluid-tightly driven onto the wall 5 such as to close an end of the body 4 and has a symmetry axis A, coinciding with the symmetry and axial sliding axis of the rod 2.

Unit 1 provides an annular rod guiding bushing 6, which is fluid-tightly fixed in use to the inner lateral wall 5 of the body 4 of the shock absorber 2, and which is symmetric to axis A in application. The annular rod guide bushing extends thorough and is engaged to the rod 2. Unit 1 further provides a sealing assembly 8, also symmetric with respect to axis A, pressed into a cup-shaped seat 9 formed on a first end 10 of the bushing 6 facing the inside of the shock absorber body 4 in application. In particular, it is integrally arranged frontally on a face 11 of the end 10, which faces towards the inside of the body 4.

Figure 2:
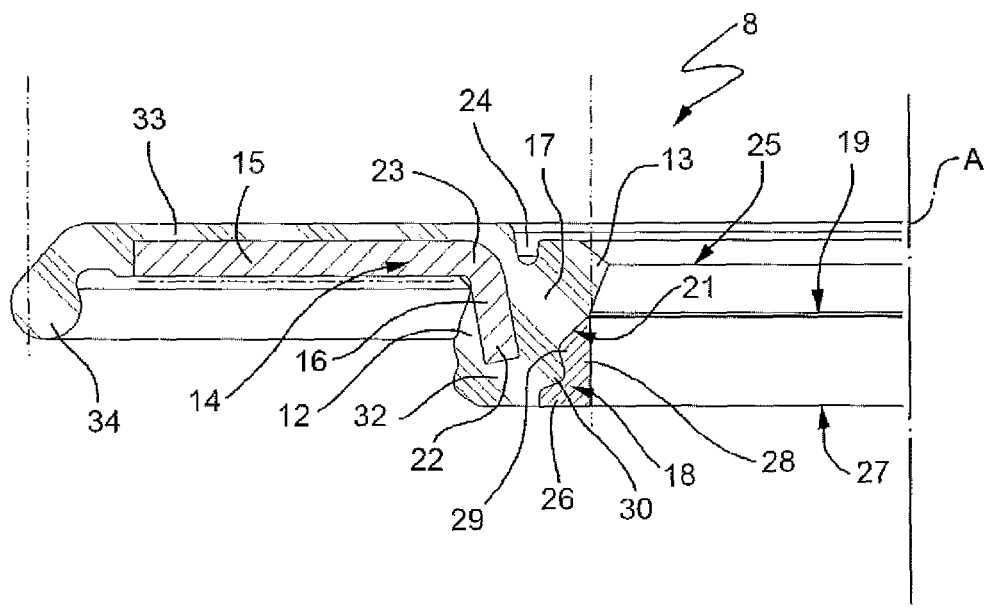
FIG. 2 illustrates, an enlarged cross section of a sealing assembly according to the present invention, as previously presented in FIG. 1.

Thus, as also shown in FIG. 2, the sealing assembly 8 comprises a sealing ring 12 made of an elastomeric material. The ring 12 has an annular sealing lip 13 that radially and axially protrudes within the cup-shaped seat 9 to slidingly cooperate with the rod 2 in use.

The sealing assembly includes a reinforcing structure 14, that is, for example metallic, but in all cases made of an elastically deformable material much more rigid than the elastomeric material of the sealing ring 12. The reinforcement structure 14 has a flange-shaped portion 15, which abuttingly cooperates against the end 10 of the bushing, and a first sleeve-shaped portion 16, which obliquely protrudes within the cup-shaped seat 9 (with respect to axis A), in a direction opposite to the direction in which the lip 13 also obliquely protrudes.

The first sleeve-shaped portion 16 is embedded in the sealing ring 12 so as to at least partially flank the lip 13 on the side of a root portion 17 of the lip 13 itself.

In one embodiment of the present invention, the sealing assembly 8 further includes a reinforcing ring 18 that is snappingly mounted in an annular seat 19 of the sealing ring 12 which is provided on the side opposite to the direction of protrusion towards axis A of the lip 13. As such, the reinforcing ring 18 is arranged axially locked against a bottom wall 20 of the cup-shaped seat 9, and packed between the bottom wall 20 and a first flank 21 of the root portion 17 of the lip 13 facing the bushing 6.

The reinforcing ring 18 is thoroughly engaged in use by the rod 2 (FIG. 1) and, according to an aspect of the invention, is made of a low friction coefficient material but more rigid than the elastomeric material of the sealing ring 12 and axially extends into the cup-shaped seat 9 up to flank at least one terminal end 22 of the first sleeve-shaped portion 16 of the reinforcing structure 14, yet on the side opposite to the reinforcing structure 14.

Examining the sealing assembly 8 alone, without considering the presence of the bushing 6 (FIG. 2), the lip 13 protrudes radially and axially towards the symmetry axis A of the same in a first oblique direction with respect to axis A; and the reinforcing structure 14 is provided with an assembly portion defined by the flange-shaped portion 15 from which the first sleeve-shaped portion 16 overhangingly extends, which protrudes obliquely towards the symmetry axis A, yet in a direction opposite to the direction in which lip 13 protrudes towards the axis A itself.

As previously mentioned, the first sleeve-shaped portion 16 of the reinforcing structure 14 is embedded in the sealing ring 12 so as to flank at least in part the lip 13 on the side of the root portion 17 of the latter and the reinforcement ring 18 is snappingly fitted in the seat 19, obtained on the side opposite to the direction of protrusion of the lip 13, so that the reinforcement ring 18 is arranged against the side 21 of the root portion 17 of the lip 13 facing the terminal end 22 of the first sleeve-shaped portion 16 of the reinforcing structure.

The first sleeve-shaped portion 16 overhangingly extends from the flange-shaped portion 15, in particular from an inner radial edge 23 of the same facing axis A, from the side opposite to the lip 13, while the latter overhangingly extends from the root portion 17 in such a direction to form an obtuse angle with the first sleeve-shaped portion 16, in radial section (FIG. 2).

The sealing ring 12 has, on the side opposite to the flank 22 of the root portion 17, a frontal annular groove 24, which is substantially coplanar with the flange-shaped portion 15 of the reinforcing structure 14 and is inscribed within a radially inner edge 23 from which the first sleeve-shaped portion 16 departs.

In particular, the annular groove 24 extends within the sealing ring 12 by an axial depth such as to define a predetermined radial clearance between at least part of the lip 13, on the side opposite to a sealing lip 25 thereof, and at least part of the first sleeve-shaped portion 16 of the reinforcing structure 14, so as to allow the lip 13 to be deformed in use (see FIG. 3) towards the reinforcing structure 14, being however supported by the first sleeve-shaped portion 16, which, according to a further aspect of the invention, is made so as to be at least in part elastically deformable and, as a consequence, to be able to bend in use towards the side wall of the cup-shaped seat 9.

In one embodiment of the present invention, the reinforcing ring 18 is substantially L-shaped in radial section, because it comprises a flange-shaped portion 26 axially accommodated against an inlet opening 27 of the annular seat 19 of the sealing ring 12, and a second sleeve-shaped portion 28, which cooperates in contact, at a free end thereof, with the flank 21 of the root portion 17 of the lip 13.

Furthermore, in combination, the terminal end 22 of the first portion 16 of the reinforcing structure 14 extends within the sealing ring 12 in a direction opposite to the direction of axial extension of the second sleeve-shaped portion 28 of the reinforcing ring 18 by a length such that the root portion 17 of the sealing lip 12 remains packet tight sandwiched, on its opposite sides, between the reinforcing ring 18 and the first sleeve-shaped portion 16, which is elastic but in all cases much more rigid than the lip 13.

In particular, the second sleeve-shaped portion 28 of the reinforcing ring 18 has a radial annular tooth 29 engaged between the flank 21 of the root portion 17 of the lip 13 and an annular counter-tooth 30 of shape mating with that of the tooth 29, obtained in one piece on the sealing ring 12, within the annular seat 19 of the same between the inlet opening 27 and the flank 21; the terminal end 22 of the first sleeve-shaped portion 16 of the reinforcing structure 14 extends into proximity with the annular tooth 29.

According to a non-secondary aspect of the invention, the sealing ring 12 may be made of an elastomeric material chosen from the group consisting of NBR (nitrile butadiene rubber), HNBR (hydrogenated nitrile butadiene rubber), FMK (fluoroelastomer, the features of which are defined by ASTM D1418; the code FMK indicates a family of fluoroelastomers which differ from one another in terms of fluoride content and which mainly consist of vinylidene fluoride, with the addition of other components such as tetrafluoroethylene, known as TFE, and hexafluoropropylene, known as HFP).

In combination with such a selection of materials, the reinforcing ring 18, which is in use slidingly engaged by the rod 2, is made of a material chosen from the group consisting of PTFE (polytetrafluoroethylene) or PA (polyamide) filled with a material chosen from the group consisting of bronze, graphite, glass fibers and combinations thereof. In particular, graphite contributes to decreasing friction, while bronze contributes to reducing wear.

In one embodiment of the present invention, between the bottom wall 20 of the cup-shaped seat 9 of the rod guiding bushing 6 and the reinforcing ring 18 is arranged a flat ring 31 made of a relatively rigid metallic or synthetic plastic material, which extends radially on substantially the entire extension of the bottom wall 20 of the cup-shaped seat 9, interposed between the latter and a terminal end 32 of the sealing ring 12 opposite to the lip 13 and free from reinforcing structure, arranged immediately adjacent to said terminal end 22 of the first sleeve portion 16 of the reinforcing structure 14.

In order to increase the integration of the unit 1, the sealing unit 12 has a flange-shaped portion 33, which extends in radial direction to cover the entire face 11 of the end 10 of the rod guiding bushing 6, and which is at least in part supported by the flange-shaped portion 15 of the reinforcing structure 14, which is interposed between the flange-shaped portion 33 and the end 10; furthermore, the flange-shaped portion 33 has an outer radially thickened peripheral edge 34, being substantially toroidal-shaped in undeformed conditions (FIG. 2), which snappingly engages an annular groove 35 made on a peripheral edge 36 of the end of the bushing 10 and which cooperates in use by interference with the lateral wall 5 of the shock absorber body 4 to exert a static sealing action thereon towards the oil contained in the body 4.

Figure 3:
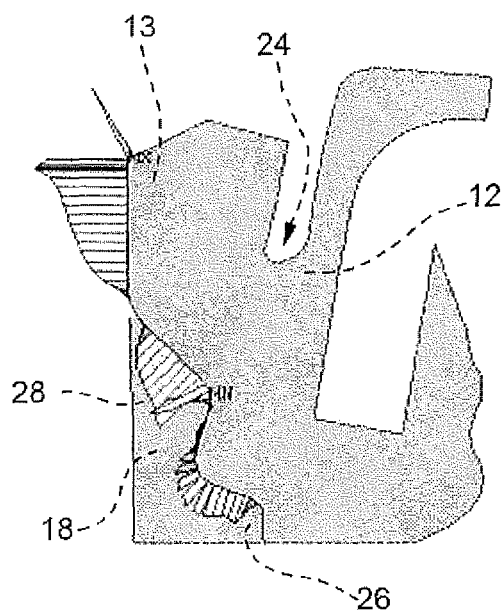
FIG. 3 illustrates the result of a finite element analysis simulation run on the sealing assembly shown in FIG. 2 and under the working arrangement illustrated in FIG. 1.

Finally, with reference to FIG. 3, it is apparent that the described structure allows even distribution of the loads so as to decrease the stress to which the lip 13 is subjected without decreasing the contact pressures required to obtain efficient hydraulic sealing. Such a situation surprisingly protracts over time and occurs also at very low temperatures of approximately minus 40° C., allowing efficient hydraulic seals with materials, such as standard FKM, normally not completely efficient at these temperatures. Furthermore, extremely compact and totally integrated guiding and sealing units may be made. The unit 1 according to the invention may be integrated with accessories, such as a low friction coefficient guiding sleeve 37 for the rod 2, fully inserted through the bushing 6, and a dust boot 38 mounted externally on the bushing 6, on the side opposite to end 10.

The invention claimed is:

1. A guiding and sealing unit for a rod of a mono-tube shock absorber, the unit comprising:
    an annular rod guide bushing fixedly sealed to an inner lateral wall of a body of the mono-tube shock absorber, and wherein,
    the annular rod guide bushing extends through the rod and is engaged with the rod;
    a sealing assembly pressed into a cup-shaped seat formed on a first end of the bushing facing the inside of the shock absorber body, the sealing assembly comprising:
    a sealing ring made of an elastomeric material and having an annular sealing lip, which radially and axially protrudes within the cup-shaped seat to slidingly cooperate with the rod, and
    a metallic reinforcing structure having a flange-shaped portion abutting against the first end of the bushing, and
    a first sleeve-shaped portion that obliquely protrudes within the cup-shaped seat in a direction opposite to the direction in which the lip protrudes, and wherein,
    the first sleeve-shaped portion is embedded in the sealing ring so as to at least partially flank the lip on the side of a root portion of the lip, and wherein,
    the unit further includes a reinforcing ring snappingly mounted in an annular seat of the sealing ring provided on the side opposite to the direction of protrusion of the lip and wherein,
    the reinforcing ring is arranged axially locked against a bottom wall of the cup-shaped seat, packed between the bottom wall and a first flank of the root portion facing the bushing, and wherein,
    the reinforcing ring extends through the rod and engages the rod, and wherein,
    the reinforcing ring is made of low friction coefficient material, and wherein,
    the reinforcing ring is formed from a material that is more rigid than the elastomeric material of the sealing ring, and wherein,
    the reinforcing ring axially extends into the cup-shaped seat up to flank at least one terminal end of the first sleeve-shaped portion of the reinforcing structure, but on the side opposite thereto, and wherein
    a ring disposed between the bottom wall of the cup-shaped seat and the reinforcing ring is formed from a relatively rigid synthetic plastic material, and extends radially on substantially the entire extension of the bottom wall of the cup-shaped seat, and interposed between the latter and a terminal end of the sealing ring opposite to the lip and free from the reinforcing structure, arranged immediately adjacent to said terminal end of the sleeve-shaped portion of the reinforcing structure.

2. The guide and sealing unit according to claim 1, wherein the first sleeve-shaped portion overhangingly extends from the flange-shaped portion, on the side opposite to the lip, and wherein,
    the lip overhangingly extends from the root portion in a direction to form an obtuse angle with the first sleeve-shaped portion, in radial section, and
    the sealing ring having on the side opposite to said first flank of the root portion, a frontal annular groove, which is substantially coplanar with the flange-shaped portion and is inscribed within a radially inner edge of the flange from which the first sleeve-shaped portion departs.

3. The guide and sealing unit according to claim 2, wherein the annular groove extends within the sealing ring by an axial depth such as to define a predetermined radial clearance between at least part of the lip, on the side opposite to a sealing lip, and at least part of the first sleeve-shaped portion.

4. The guide and sealing unit according to claim 1, wherein the reinforcing ring is substantially L-shaped in radial section, and comprises:
    a flange-shaped portion axially accommodated against an inlet opening of the annular seat of the sealing ring, and
    a second sleeve-shaped portion in contact, at a free end thereof, with the first flank of the root portion, the terminal end of the first sleeve-shaped portion of the reinforcing structure extending within the sealing ring in a direction opposite to the direction of axial extension of the second sleeve-shaped portion of the reinforcing ring by a length such that the root portion remains sandwiched on opposite sides between the reinforcing ring and the first sleeve-shaped portion of the reinforcing structure, which is at least in part elastically deformable.

5. The guide and sealing unit according to claim 4, wherein the second sleeve-shaped portion of the reinforcing ring has a radial annular tooth engaged between the first flank of the root portion of the sealing lip and an annular counter-tooth of mating shape, integrally formed into one piece on the sealing ring, within the annular seat, between the inlet opening and the first flank of the root portion of the sealing lip; and wherein,
    the terminal end of the sleeve-shaped portion of the reinforcing structure extends up into proximity with the radial annular tooth.

6. The guide and sealing unit according to claim 1, wherein the sealing ring (12) is made from at least one of an elastomeric material chosen from the group consisting of NBR, HNBR, FMK, and the reinforcement ring is formed from a material chosen from the group consisting of at least one of a PTFE or PA filled with a material chosen from the group consisting of at least one of a bronze, graphite, or glass fiber.

7. The guide and sealing unit according to claim 1, wherein the sealing ring has a flange-shaped portion that extends in a radial direction to cover the entire face of the first end of the stem guide bushing facing the inside of the shock absorber body, and wherein,
    the flange-shaped portion is at least in part supported by said flange-shaped portion of the reinforcing structure, which is interposed between the flange-shaped portion of the sealing ring and the first end of the bushing, and wherein, the flange-shaped portion of the sealing ring has an outer radially thickened peripheral edge that is substantially toroidal-shaped, which snappingly engages an annular groove disposed on a peripheral edge of said first end of the bushing and which cooperates by interference with the lateral wall of the shock absorber body to exert a static sealing action.

8. The guide and sealing unit according to claim 1, wherein the reinforcing ring is substantially L-shaped in radial section, and comprises:

a flange-shaped portion axially accommodated against an inlet opening of the annular seat of the sealing ring, and a second sleeve-shaped portion which contacts, at a free end thereof, with the first flank of the root portion, and wherein the terminal end of the sleeve-shaped portion of the reinforcing structure extends within the sealing ring in a direction opposite to the axial extension direction of the second sleeve-shaped portion by a length such that the root portion of the sealing lip remains sandwiched, on opposite sides, between the reinforcement ring and the first sleeve-shaped portion of the reinforcing structure.

9. A sealing assembly for a rod of a mono-tube shock absorber, comprising:

a sealing ring formed from an elastomeric material and having an annular sealing lip, which radially and axially protrudes towards a symmetry axis (A) of the lip in a first oblique direction with respect to the symmetry axis (A); and a metallic reinforcing structure that has a flange-shaped assembly portion and a first sleeve-shaped portion, which obliquely protrudes towards the symmetry axis (A), in a direction opposite to the direction in which the lip protrudes and which is embedded in the sealing ring so as to flank at least in part the lip on the side of a root portion of the lip, and wherein, the sealing assembly further provides a reinforcing ring snappingly mounted in an annular seat of the sealing ring provided on the side opposite to the direction of protrusion of the lip, so that the reinforcing ring is arranged against a first flank of the root portion facing on the side of a terminal end of the first sleeve-shaped portion, and wherein, the reinforcing ring is adapted to extend through the rod and is engaged to the rod, and wherein, the reinforcing ring is formed from a low friction coefficient material more rigid than the elastomeric material of the sealing ring, and axially extending up to flank at least the terminal end, on the side opposite to the reinforcing structure.

* * * * *